May 23, 1933. G. L. MILLER 1,910,625

GOVERNOR CUT-OFF SWITCH

Filed Nov. 8, 1929

Inventor
George L. Miller
By Wallace R. Lane
Atty.

Patented May 23, 1933

1,910,625

UNITED STATES PATENT OFFICE

GEORGE L. MILLER, OF NEWTON, IOWA, ASSIGNOR TO THE MAYTAG COMPANY, OF NEWTON, IOWA, A CORPORATION OF DELAWARE

GOVERNOR CUT-OFF SWITCH

Application filed November 8, 1929. Serial No. 405,618.

The present invention relates to a governor cut-off switch or mechanism and more in particular to a centrifugally operated means for automatically cutting off the supply of current to a motor or other power unit.

Among the objects of the present invention are to provide a novel mechanism for automatically cutting off the electrical current or opening the circuit to a motor or other power unit when said motor or power unit, or other machine driven thereby, becomes overloaded and the speed of the motor or power unit shaft is decreased.

The invention comprehends the idea of having manually operable means for closing or throwing a toggle or pivotally operated switch into "on" position, and automatically operated means for throwing said switch to "open" or "off" position. In the present construction of motors or other power units, there is great danger of excessive heating of the motor winding and other damage caused to the operating mechanism thereof whenever said motor or power unit is overloaded. This overloading will normally cause the rotor or armature to decrease in speed of rotation. In the present construction, this decreased speed of rotation is taken advantage of by means of a centrifugal governor, which will trip the switch into "open" or "off" position whenever the rotor or armature speed decreases below a predetermined speed of rotation.

A further object of the invention is to provide a cut-off or tripping mechanism which automatically cuts off the current to the motor by opening the switch when the power has been shut off at some other point, the switch remaining open and the current off until the switch is again manually operated for starting the motor.

Another object of the invention is to provide a novel switch construction provided with means adapted to be tripped by a projecting arm or member, the tripping thereof protecting a motor or other power unit against overloading.

A still further object is to provide a novel combination of a governor and a switch alapted to be positively and automatically operated thereby whenever the speed of rotation decreases beyond a predetermined amount.

Other objects are to provide a construction of maximum simplicity, efficiency, economy and ease of assembly and operation, and such further objects, advantages and capabilities as will later more fully appear and are inherently possessed thereby.

The invention further resides in the combination, construction and arrangement of parts illustrated in the accompanying drawing, and while I have shown therein a preferred embodiment, I desire it to be understood that the same is susceptible of modification and change without departing from the spirit of my invention.

Figure 1:
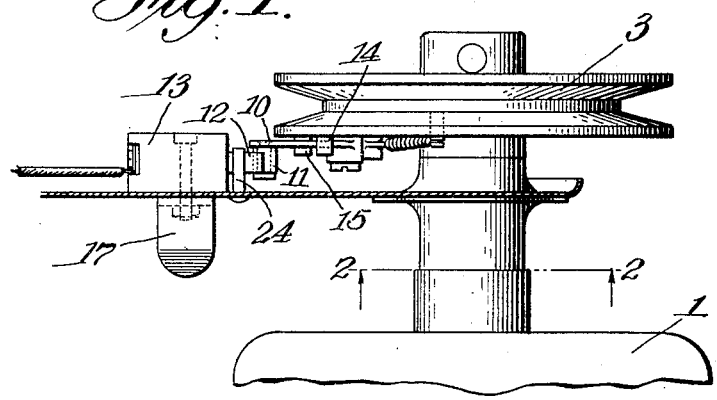
Fig. 1 is a top plan view of the motor switch and governor for operating the same.

Referring more particularly to the disclosure in the drawing, the numeral 1 refers to a motor or other power unit provided with a shaft 2 and a pulley 3 mounted on said shaft, this pulley being adapted to drive, by means of a belt or chain (not shown), mechanisms with which the belt or chain is connected. Mounted upon the sheave pulley 3, is a double armed centrifugal governor 4 pivoted on the pulley by means of a stud pin 5. The lower or shorter arm 6 of the governor is provided with a projecting ear 7 adapted to be connected to a spring 8, the spring being held at its other end by means of a pin 9. The outer or longer end 10 of the governor is provided with a roller 11 adapted to engage and trip a switch arm or toggle 12 of the toggle or pivotally operated motor switch 13. Stop pins 14 and 15 limit the working movement of the arm 10 of the governor.

Figures 2, 3:
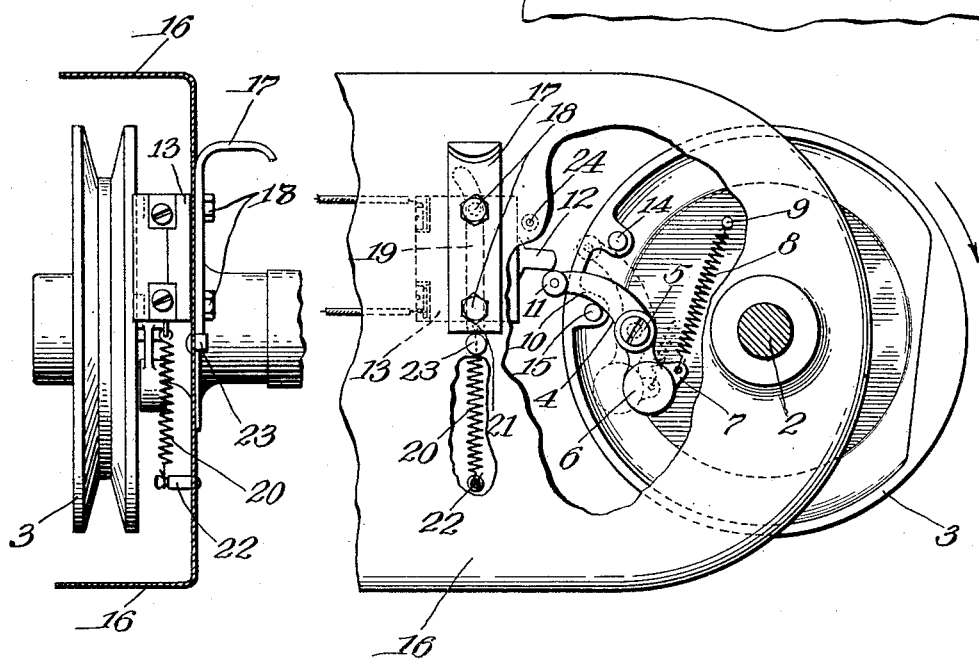
Fig. 2 is a view in side elevation taken on the line 2—2 of Fig. 1, with a portion thereof broken away to more clearly disclose the governor and switch construction.
Fig. 3 is a view in side elevation of the switch construction.

In receded position as shown in full lines in Fig. 2 of the drawing, the arm 10 of the governor projects radially outwardly and communicates with the switch lever 12 of the motor switch, which has been placed in the path of the rotation of the governor. The lower and heavier governor arm 6 is acted upon by the tension spring 8, which normally tends to hold the same in receded position.

The switch 13 is shiftably mounted on the plate or housing 16 of a machine. This switch is connected to a control handle or lever 17 by means of which the switch is raised, the switch being guided in its substantially vertical movement by a pair of bolts or lugs 18 adapted to move in a slot 19 in the housing 16.

The switch is adapted to be pulled into the path of the roller 11 of the governor 4 by means of a tension spring 20 connected to the lower end of the switch at 21 and to a pin 22 on the housing. In order to insure a proper working contact between the switch and the governor, the handle 17 rests at its lower end against the stop pin 23. The switch in this position and with the governor in the receded position, will always be turned off.

In order to turn the switch on, the handle 17 is pulled upwardly against the tension of the spring and imparting an upward movement to the switch. In its upward movement, the lever arm 12 of the switch will impinge against pin or lug 24 on the housing 16, be moved or tripped downwardly into closed or turned on position, thus starting the motor or power unit. As the speed of the motor or power unit increases, the centrifugal governor 4 will move inwardly against the spring 8, as shown in the dotted line position in Fig. 2, thus drawing the projecting arm 10 from the path of the switch lever 12. The switch handle 17, when manually released will be then returned to its normal or stop position by reason of the spring 20, the switch lever assuming a position to be acted upon by the arm 10 of the governor when the motor or power unit becomes overloaded and the speed of rotation of its shaft decreases to a point whereby the tension of the spring 8 is greater than the centrifugal force acting upon the governor arm.

From the above description and the disclosure in the drawing, it will be seen that I have provided a unique and positively operating means of cutting off or opening the switch and circuit leading to a motor or other power unit. The construction is a positive protection against overloading of such motor or power units and thus prevents the damage which is incident to such overloading.

While I have herein described and upon the drawing illustrated an embodiment of the invention, it is to be understood that the latter is not limited thereto, but comprehends other details, arrangements of parts, features and constructions, without departing from the spirit of the invention.

Having thus disclosed the invention, I claim:

1. A mechanism for controlling the current supply to a power unit provided with a rotating member, comprising a movable switch provided with a handle adapted to raise the same, a switch lever pivotally mounted on said switch and adapted to be moved into closed position when the handle is raised, and means on said rotating member adapted to trip said lever into open position when the speed of rotation of said unit decreases below a predetermined amount.

2. A mechanism for controlling the current supply to a power unit, comprising a movable switch provided with a handle adapted to raise the same, a switch lever pivotally mounted on said switch and adapted to be moved into closed position when the handle is manually raised, said lever being automatically tripped into open position when the speed of rotation of said unit decreases below a predetermined amount.

3. In a power unit including a switch for controlling the current to said unit, means for manually raising said switch, a switch lever, a lug positioned to trip said lever into closed position when said switch is raised, means for lowering said switch when released, and a centrifugally operated governor adapted to trip said lever, when in said lowered position, into open position as the speed of rotation of said unit decreases below a predetermined amount whereby to cut off the current flowing to said unit.

4. In a power unit including a switch for controlling the current to said unit, means for manually raising said switch, a switch lever, a lug positioned to trip said lever into closed position when said switch is raised, means for lowering said switch when released, and an arm on a moving part of said power unit adapted to extend outwardly from said moving part and trip said lever into open position after said switch has been returned to its normal lowered position and when the speed of rotation of said unit decreases below a predetermined amount.

5. In a power unit including a switch on a stationary part of said unit, means for manually moving said switch, a switch lever, a lug positioned to trip said lever into closed position when said switch is moved, means for returning said closed switch to its former position when released, and an arm on a moving part of said unit adapted to be held inwardly of said moving part by the centrifugal force of the normal predetermined speed of said unit and adapted to swing outwardly from said moving part when the speed of rotation of said part decreases below the predetermined amount, said arm being positioned so as to trip said lever into open position when so extended and thereby cut off the current flowing to said unit.

6. In combination with a switch for controlling the current to a power unit including a switch lever for opening and closing said switch, means for raising said switch manually, means for tripping said lever when said switch is raised whereby to close said switch, means for returning said closed switch to its normal lowered position, an arm on a rotatable part of said unit held inwardly of the periphery of said part by centrifugal force when said part is rotating at normal speed, and means for extending said arm outwardly whereby to trip said lever and thereby open said switch when the speed of rotation of said unit has decreased below said normal amount.

7. In combination with a switch to control the current to a power unit having a rotating part, a lever on said switch adapted to be tripped and thereby open and close said switch, means for manually raising said switch, means for tripping said lever and thereby closing said switch when said switch is raised, a centrifugally controlled arm on said rotating part of said unit adapted to be held within the periphery of said rotating part when the speed of rotation is normal, and means for extending said arm beyond the periphery so as to trip said lever and open said switch when the speed of rotation decreases below the normal amount.

In witness whereof, I hereunto subscribe my name to this specification.

GEORGE L. MILLER.